United States Patent [19]

Cripps et al.

[11] Patent Number: 4,930,140
[45] Date of Patent: May 29, 1990

[54] CODE DIVISION MULTIPLEX SYSTEM USING SELECTABLE LENGTH SPREADING CODE SEQUENCES

[75] Inventors: Peter K. Cripps, New Hope; Michael A. Plotnick, Southhampton, both of Pa.

[73] Assignee: Agilis Corporation, Mountain View, Calif.

[21] Appl. No.: 297,412

[22] Filed: Jan. 13, 1989

[51] Int. Cl.⁵ .............................................. H04K 1/00
[52] U.S. Cl. .......................................... 375/1; 370/18
[58] Field of Search ...................... 375/1, 96; 370/18; 364/728

[56] References Cited

U.S. PATENT DOCUMENTS

| | | |
|---|---|---|
| 4,383,323 | 5/1983 | Timor . |
| 4,455,651 | 6/1984 | Baran . |
| 4,611,333 | 9/1986 | McCallister et al. ................... 375/1 |
| 4,701,905 | 10/1987 | Un et al. . |
| 4,703,474 | 10/1987 | Foschini et al. . |
| 4,779,265 | 10/1988 | O'Connor et al. . |

Primary Examiner—Benedict V. Safourek
Assistant Examiner—Christopher O. Edwards
Attorney, Agent, or Firm—Skjerven, Morrill, MacPherson, Franklin & Friel

[57] ABSTRACT

A code division multiplex system for use in a spread spectrum communication system utilizes selectable length spread spectrum spreading code sequences. At the encoder, one of a pluraluty of a spread spectrum spreading code sequences having a given fixed length is selected for differential encoding in accordance with the input data to be transmitted. At the receiver correlator, a selectable length differential decoder is set to be responsive to a spread spectrum spreading code sequence having a length substantially equal to the length of the encoded spread spectrum spreading code sequence.

15 Claims, 4 Drawing Sheets

CODE DIVISION MULTIPLEX SYSTEM USING SELECTABLE LENGTH SPREADING CODE SEQUENCES

FIELD OF THE INVENTION

This invention relates to code division multiplex systems particularly for use in spread spectrum communication systems.

BACKGROUND OF THE INVENTION

Code division multiplexing in spread spectrum communication systems is well known. In a spread spectrum communication system, a spreading code sequence is used to disperse the energy content of an original input data signal in the frequency spectrum. In order to transmit each data bit in a spread spectrum communication system, each individual data bit is first multiplied by the spreading code sequence in an exclusive OR gate. In a typical system, for a data bit of zero, the spreading code sequence itself is transmitted; while for a data bit of one, the inverse of the spreading code sequence is transmitted.

At the receiver, the spreading code sequence is detected by correlating the received spread spectrum signal with knowledge of the original spreading code sequence which was used at the transmitter. One method and apparatus for encoding transmitted data and correlating received data in a spread spectrum system can be found in a co-pending patent application entitled "DIFFERENTIAL CORRELATOR FOR SPREAD SPECTRUM COMMUNICATION SYSTEM", serial number 271,614, filed Sept. 15, 1988 and assigned to the same assignee as the assignee of the present invention.

The object in any multiplex communication system (such as a frequency division multiplex system or a time division multiplex system, as well as a code division multiplex system), is to provide for independent communication paths between individual devices without interference to neighboring devices, i.e., to establish distinct channels of communication without mutual interference.

Code division multiplex, or CDM, is a method for establishing such different distinct channels in a spread spectrum communication system. In a CDM communication system, different spreading code sequences are used to distinguish the different data communication channels. Each spread spectrum receiver correlates the received signal with a particular spreading code sequence, thereby establishing independent channels of communication, one channel for each distinct spread spectrum spreading code sequence used.

The individual bits of the final spread spectrum signal, consisting of the spreading code sequence combined with the message data, are called chips. As used herein, the term chip may also apply to the individual bits of the spreading code sequence particularly during the process of combining the spreading code sequence with the message data at the transmitter encoder, or in the process of separating the message data from the spreading code sequence at the receiver correlator.

SUMMARY OF THE INVENTION

The present invention is embodied in a code division multiplex system in which a plurality of communication channels are created at the transmitter encoder by selecting one of a plurality of different length spreading code sequences. At the receiver correlator, each of the separate spread spectrum communication channels are distinguished and detected substantially on the basis of the length of the received spreading code sequence.

The present invention is further embodied in a differential encoder wherein a spreading code sequence of a given fixed length is selected from a plurality of spreading code sequences which have respective distinct lengths. The selected spreading code sequence is then differentially encoded in accordance with the input data. That is, each chip of the selected spreading code sequence is inverted, or not inverted, in accordance with the input data, relative to the spreading code sequence a fixed time delay previously, which fixed time delay is also selectable at the encoder, and is set substantially equal to the length of the selected spreading code sequence.

The present invention is further embodied in a spread spectrum receiver in which each received chip is compared with a chip received a selectable fixed time delay previously, which time delay is set to be substantially equal to the length of the desired selected spreading code sequence. If the present received chip and the previously received chip (at the selected fixed time delay previously) are equal, then the received data is a logic 0. If the present received chip and the previously received chip are not equal, then received data is a logic 1.

Since the length of the spreading code sequence selected in the encoder is substantially equal to the time delay selected in the receiver correlator, the data is recovered. For those receivers wherein the selected time delay does not match the length selected spreading code sequence in the encoder, the receiver correlator will produce an uncorrelated noise like output. However, the extent of code division multiplex descrimination depends on the cross correlation properties of the chosen plurality of spreading code sequences.

DETAILED DESCRIPTION

Figure 1:
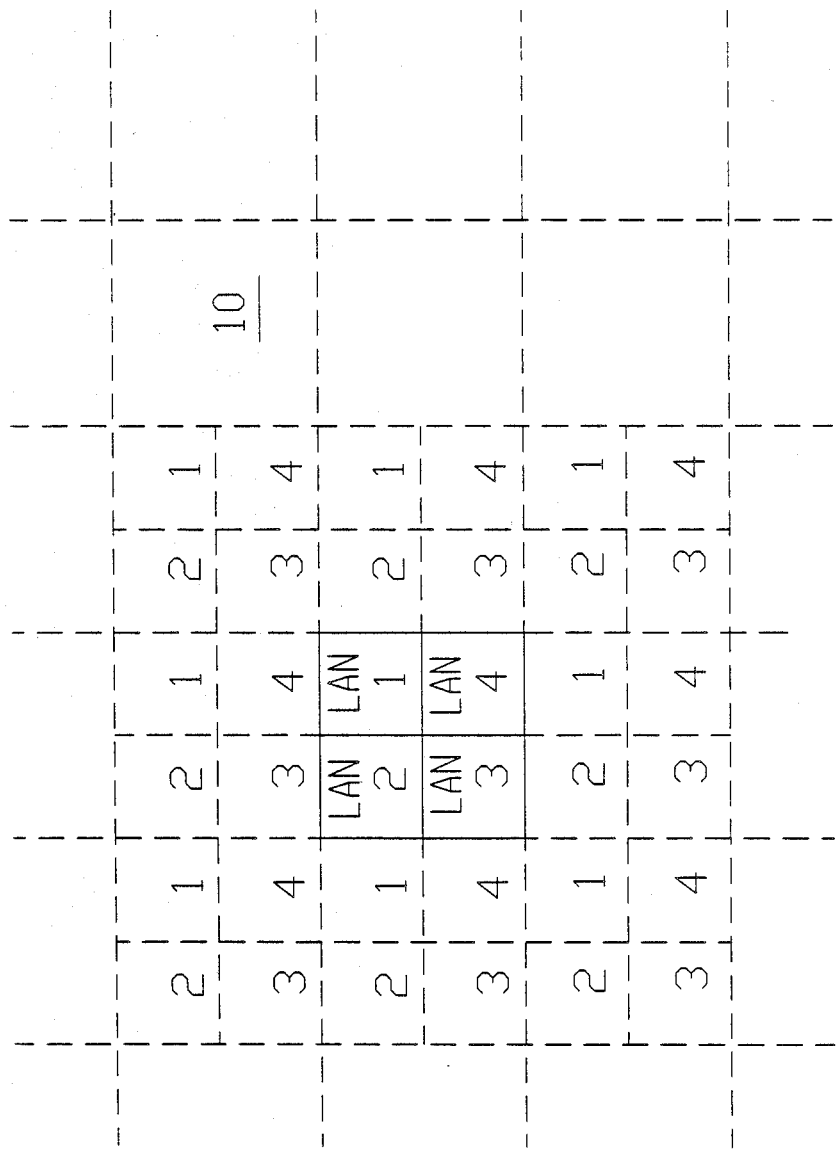
FIG. 1 is a topological map of plurality of local area networks embodying the present invention arranged in a plurality of cells.

FIG. 1 illustrates the general situation presented in a multiplexed data communication environment. In a given area 10, it is desired to provide for more than one non-intefering communication channel.

Specifically, a given area 10 may be divided into four cells each containing separate local area networks, i.e., LAN 1, LAN 2, LAN 3, and LAN 4. Within each of the four respective LAN cells, a separate data communication channel is used to communicate between local devices within each LAN cell. That is, printers, file servers and the like are shared by individual computers and computer terminals within a LAN cell. However, it is desired that there be no interference with neighboring LANs using separate data communication channels in adjacent cells.

In a CDM spread spectrum communication system, each of LAN 1, LAN 2, LAN 3, and LAN 4 typically uses a different spreading code sequence length so that the four LANs can coexist in an area 10 simultaneously using the same portion of the frequency spectrum without adjacent channel interference. In order to create the separate channels, LAN 1 uses a first spreading code sequence length while LAN 2, LAN 3, and LAN 4 each use respective different 2nd, 3rd, and 4th spreading code sequence lengths. The topological pattern of the four cells is repeated in adjacent areas so that the minimum distance between cells using the same spreading code sequence length is two.

Figure 2:
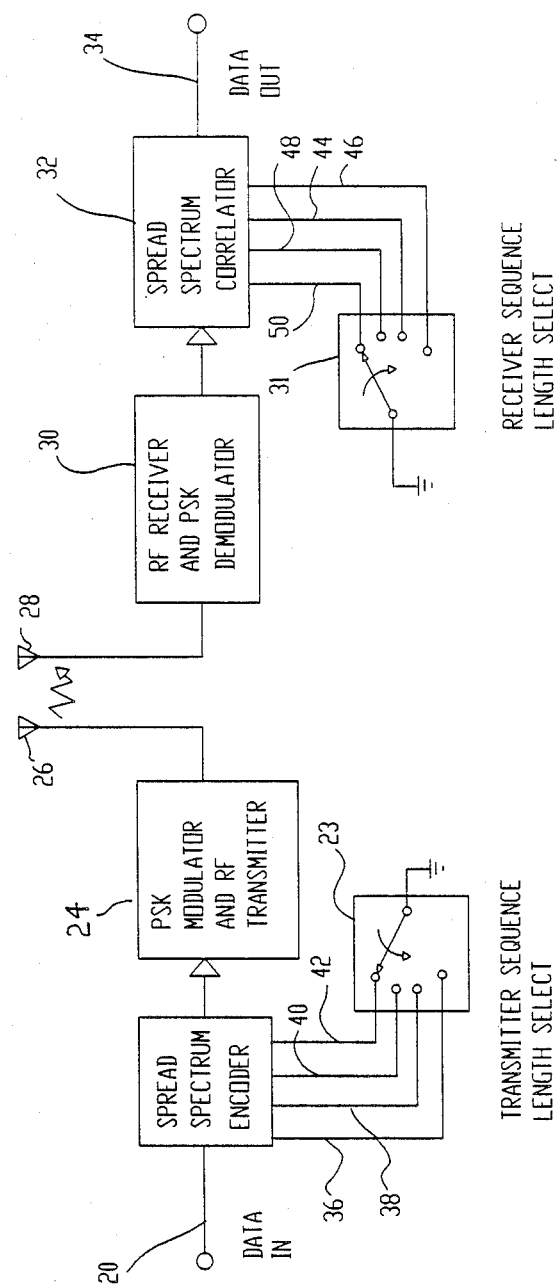
FIG. 2 is a block diagram of a spread spectrum receiver and a spread spectrum transmitter in accordance with the present invention.

A spread spectrum communication system using selectable length spreading code sequences in accordance with the present invention is shown in FIG. 2.

Data input at terminal 20 is applied to spread spectrum encoder 22 which is in turn input to PSK modulator and RF transmitter 24. The output of the RF transmitter is applied to transmitter antenna 26. After transmission through a suitable medium and reception by receiving antenna 28, the signal is applied to RF receiver and PSK demodulator 30. The output of the PSK demodulator is applied to a spread spectrum correlator 32 to recover the original data at output terminal 34.

The length of the spreading code sequence utilized in the transmitter spread spectrum encoder 22 is set by a transmitter sequence length select switch 23 (shown symbolically as a rotary switch) which places an enabling signal on one of four sequence length select lines 36, 38, 40, or 42 connected to spread sprectrum encoder 22. Similarly, at the receiver the length of the spreading code sequence utilized by the receiver spread spectrum correlator 32 is set by a receiver sequence length select switch 31 (also shown symbolically as a rotary switch) which places an enabling signal on one of four sequence length select lines 44, 46, 48, or 50 connected to spread spectrum correlator 32.

In operation, one of four different spreading code sequence lengths in the transmitter is selected by setting the transmitter sequence length select switch 23 to one of its four different settings. In the receiver, one of four different spreading code sequence lengths is selected by setting receiver sequence lengths select switch 31 to one of its four different settings.

If the transmitter portion and receiver portion of FIG. 2 are in the same LAN cell, and are intended to communicate over a common data channel, then the length of the selected spreading code sequence in the transmitter is set equal to the length of the selected spreading code sequence in the receiver. On the other hand, if the receiver portion of FIG. 2 is intended to operate in a different LAN cell without interference from the transmitter in the first LAN cell, then the length of the spreading code sequence selected in the receiver is not equal to the length of the spreading code sequence selected in the transmitter.

In such manner, all of the spread spectrum encoders and spread spectrum correlators utilized within LAN 1 are adjusted to use a spreading code sequence of a first length, while all of the respective spread spectrum encoders and spread spectrum correlators in adjacent LAN cells 2, 3, and 4, are selected to use respective spreading code sequences of a second, third, and fourth length.

Figure 3:
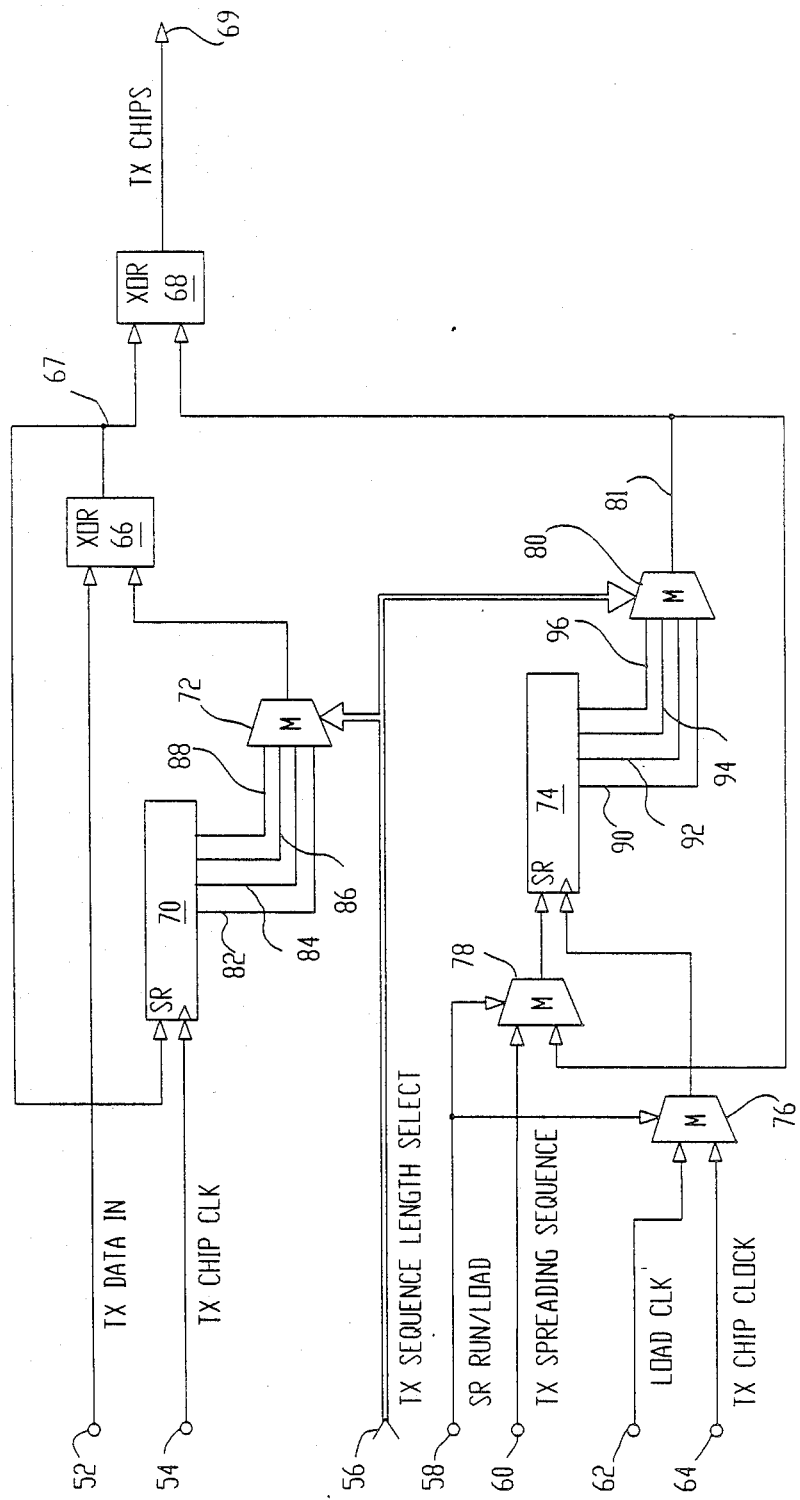
FIG. 3 is a schematic diagram, partially in block form, of a spread spectrum encoder in accordance with the present invention.

FIG. 3 shows a transmitter encoder in accordance with the present invention which may be used to generate a spread spectrum signal having a selectable length spreading code sequence. The transmitter encoder includes a differential encoder portion and a selectable length spreading code sequence generator portion.

The differential encoder portion comprises a multiple tap shift register 70, a 4 to 1 multiplexer 72, exclusive OR gate 66, and exclusive OR gate 68. Multiplexer 72 is connected for selecting one of the four multiple taps, or output stages, of shift register 70 on one of four conductors 82, 84, 86, or 88, respectively in accordance with a transmitter sequence length select signal input on input data buss 56.

Input data buss 56 is a two bit data buss which controls multiplexer 72 so as to select one of the four multiple taps of shift register 70 as one input to exclusive OR gate 66. Thus, multiplexer 72 is responsive to the transmitter sequence length select signal on input data buss 56 to control the effective length of shift register 70, the output of which is input to exclusive OR gate 66. The output of exclusive OR gate 66 is connected to one input of exclusive OR gate 68 and is also connected in a feedback configuration to the data input terminal of shift register 70. The transmitter chip clock on terminal 54 is connected to the clock input of shift register 70.

The selectable length spreading sequence generator portion of FIG. 3 comprises a multiple tap shift register 74, a 4 to 1 multiplexer 80, a 2 to 1 multiplexer 76, and a 2 to 1 multiplexer 78. A shift register run/load signal on terminal 58 is connected to the control terminals of the multiplexers 76 and 78. Multiplexer 80 is connected for selecting one of the four multiple taps, or output stages, of shift register 74 on one of four conductors 90, 92, 94, or 96, respectively in accordance with the transmitter sequence length select signal on input data buss 56, described above. Thus, multiplexer 80 is responsive to the same transmitter sequence length select signal on input data buss 56 as is multiplexer 72 so as to control the effective length of shift register 74 to be equal to the effective length of shift register 70. The output of multiplexer 80 is connected to one input of multiplexer 78, the output of which is connected to the data input of shift register 74, thereby providing a data path to recirculate the data in shift register 74 through multiplexers 80 and 78.

In operation, there is an initializing mode during which a spreading code sequence is loaded into shift register 74, followed by a run mode during which the previously loaded spreading code sequence is recirculated in shift register 74. The selected transmitter spreading code sequence on terminal 60 is serially loaded into shift register 74 through multiplexer 78. During the initializing mode, the shift register run/load signal on terminal 58 conditions multiplexer 76 to connect the load clock signal on terminal 62 to the clock input of shift register 74. The transmitter spreading sequence thus loaded into shift register 74 is the selected spreading code sequence which will be used in the transmitter encoder, and may be provided from a suitable digital memory (not shown) which contains the plurality of the spreading codes sequences to be used in the present code division multiplexing system.

After sufficient load clock pulses have elapsed to load the selected spreading sequence into shift register 74, the run mode is entered. The shift register run/load signal on terminal 58 then conditions multiplexer 76 to connect the transmitter chip clock signal on terminal 64 to the clock input of shift register 74. At the same time, the shift register run/load signal on terminal 58 conditions multiplexer 78 to connect the output of multiplexer 80 on conductor 81 to the data input terminal of shift register 74. Thus, the transmitter spreading sequence previously loaded into shift register 74 will now recirculate from the selected output tap of shift register 74 to the data input terminal of shift register 74. The resulting signal on conductor 81 is the repeating selectable length spreading code sequence which will be used to generate the output spread spectrum signal at terminal 69.

The intended purpose of the differential encoder portion of FIG. 3 is to invert, or not invert, the polarity of each chip of the selected spreading code sequence, relative to the polarity of the corresponding chip of the selected spreading code sequence a selected fixed time delay previoulsy, in accordance with the value of the input data. Specifically, if the transmitter input data signal on terminal 52 is a logic 1, the polarity of the current chip of the selected spreading code sequence at output terminal 69 relative to the polarity of the selected spreading code sequence a selected fixed time delay previously, will be inverted; if the transmitter input data signal is a 0, the encoder of FIG. 3 will not invert the polarity of the present chip of the selected spreading code sequence, relative to the polarity of the selected spreading code sequence a fixed time delay previously, at output terminal 69.

Exclusive OR gate 68 functions as a programmable inverter to invert or not invert each chip of the selected spreading code sequence on condutor 81 depending upon the value of an inversion control logic signal on conductor 67. Thus, if the signal on conductor 67 is a logic 1, the present chip of the selected spreading code sequence on conductor 81 is inverted at the output of exclusive OR gate 68 on terminal 69. Conversely, if the signal on conductor 67 is a logic 0, the present chip of the selected spreading code sequence on conductor 81 is not inverted in exclusive OR gate 68 at output terminal 69.

The previous values of the inversion control signal on conductor 67 are recorded in shift register 70 so that a previous inversion control signal, specifically at a selectable time delay previously, is input to exclusive OR gate 66 at the output of multiplexer 72. If the transmitter data input signal at terminal 52 is a logic 1, then exclusive OR gate 66 inverts the previous inversion control signal to form the present inversion control signal at conductor 67, while if the transmitter data input signal at terminal 52 is a logic 0, exclusive OR gate 66 does not invert the previous inversion control signal stored in shift register 70 to form the present inversion control signal at conductor 67.

More specifically, if the previous chip (meaning the corresponding chip of the previous cycle of the selected spreading code sequence at output terminal 69) was inverted and the transmitted data input is a logic 1, then present chip is not inverted. If the previous chip was not inverted and the transmitted data input is a logic 1, then the present chip at output terminal 69 is inverted. If the previous chip was inverted, and the transmitted data input is a logic 0, then the present chip is also inverted. If the previous chip was not inverted, and the transmitted data input is a logic 0, then the present chip is also not inverted. In such manner, the selected spreading code sequence is differentially encoded at output terminal 69 in accordance with the transmitter input data at terminal 52.

Each of the selectable spreading code sequences has unique length which correspond to the selectable lengths of shift registers 70 and 74. As a specific example, in the transmitter encoder of FIG. 3, shift registers 70 and 74 may be 18 bit shift registers. The selectable taps 82, 84, 86, and 88 of shift register 70 and the selectable taps 90, 92, 94, and 96 of shift register 74 may correspond to selectable fixed time delays or selectable length spreading code sequences of 14, 15, 17, or 18 chips respectively. In such manner, a spreading code sequence of 14, 15, 17, or 18 chips is selected. The input data in all cases, may be fixed at 16 chips per data bit.

Figure 4:
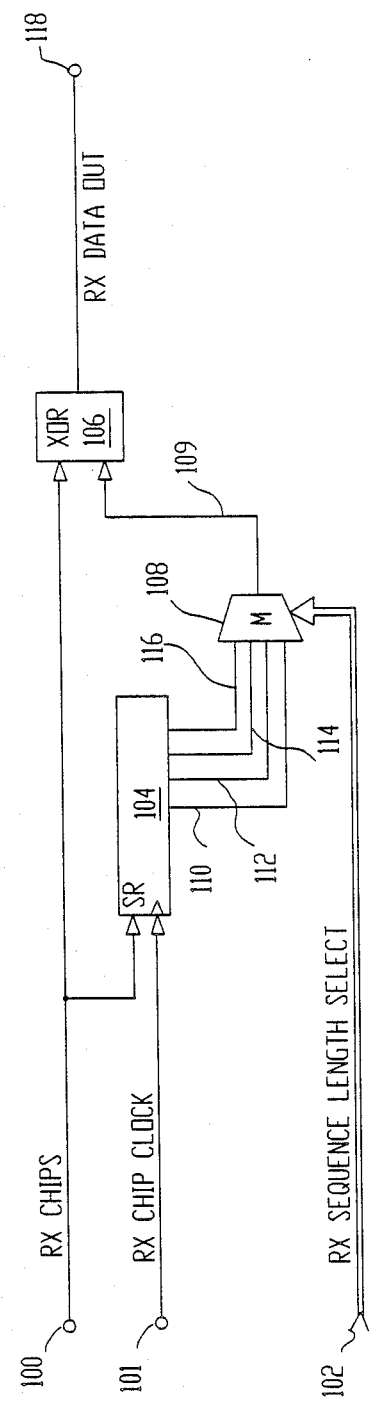
FIG. 4 is a schematic diagram, partially in block form, of a spread spectrum correlator in accordance with the present invention.

A receiver correlator for recovering the data from a spread spectrum signal encoded in accordance with a selectable length spreading code sequence, is shown in FIG. 4. The correlator comprises a multiple tap shift register 104, a 4 to 1 multiplexer 108, and an exclusive OR gate 106. Multiplexer 108 is connected for selecting one of the four output stages of shift register 70 on conductors 110, 112, 114, or 116 for input to one input terminal of exclusive OR gate 106. Multiplexer 108 is responsive to a receiver sequence length select signal input on data buss 102. The two bit input at data buss 102 conditions multiplexer 108 to select one of the plural output stages of shift register 104, thereby effectively controlling the total delay provided by shift register 104.

The receiver chip clock at terminal 101 is connected to the clock input of shift register 104. Methods for recovering the receiver chip clock signal from the received spread spectrum signal are well known to those skilled in the art and form no part of the present invention.

In operation, the shift register 104 stores the individual received chips of the spread spectrum signal received on terminal 100. The delay provided by shift register 104 and multiplexer 108, responsive to the receiver sequence length signal on data buss 102, is set equal to the length of the desired selected spreading code sequence. For example, if it is desired to receive data from an encoder using a 14 chip spreading code sequence, multiplexer 108 is set to select conductor 110 at the output tap of shift register 104 corresponding to 14 stages. Similarly, output taps for 15, 17, and 18 chips are provided at conductors 112, 114, and 116, respectively.

The output of multiplexer 108 on conductor 109 is thus the corresponding chip of the previous spreading code sequence. Now, exclusive OR gate 106 compares each received chip of the presently received spreading code sequence with a corresponding chip of the previously received spreading code sequence. Either the presently received chip of the spreading code sequence is the same as the previously received chip of the previously received sequence, in which case the received data is a logic 0, or it is the opposite of such previously received chip, in which case the received data is a logic 1.

In either event, the output of exclusive OR gate 106 at receiver data output terminal 118, will be a series of comparisons, one comparison for each chip with a correspoding chip of the previously received spreading code sequence, the total number of comparisons being equal to the total number of chips per data bit.

Following the output of the data correlator of FIG. 4, is a majority vote logic (not shown) in order to determine whether the received data bit is a 1 or a 0. Under ideal conditions, all of the output chip comparisons of over one data bit interval from exclusive OR gate 106 will be of the same polarity. In the presence of noise, some of them will be in error. However, by a majority vote of the output chips at terminal 118, improved communications reliability is achieved. In the present example, it is noted that the number of chips per data bit is always 16, even for different spreading code sequence lengths, which simplifies system design and assures relatively uniform system performance parameters regardless of the chosen spreading code sequence length.

If the spreading code sequence used to encode the received spread spectrum signal on terminal 100 is of a different length than the length selected by shift register 104 and multiplexer 108, then the receiver data output at terminal 118 will resemble an uncorrleated noise like signal. Therefore, the correlator of FIG. 4 is responsive primarily to the length of the received spreading code sequence. Signals encoded with a spreading code sequence of a different length, relative to the selectable delay provided by shift register 104 and multiplexer 108, will be ignored.

Although it is only necessary that the plurality of spreading code sequences used in the code division multiplex system of the present invention differ only in the length of the respective spreading code sequences, it is preferable to use spreading code sequences having low cross correlation properties, as well as different lengths, in order to improve system channel discrimination between the different length spreading code sequences. Also, it is understood that the shift registers 70, 74, and 104 used in the described embodiment may be replaced with any other delay element providing a selectable time delay.

Thus, a simple economical data correlator and data encoder using selectable length spreading code sequences for code division multiplexing has been described for use and conjunction with a spread spectrum communication system.

What is claimed is:

1. A method of communicating an input data signal between a transmitter and a receiver in a spread spectrum code division multiplex system, said method comprising the steps of:
    selecting a transmitter spread spectrum spreading code sequence of a given length at said transmitter;
    generating said transmitter spread spectrum spreading code sequence of said selected given length;
    selecting a transmitter time delay substantially equal to the length of said selected transmitter spread spectrum spreading code sequence;
    differentially encoding said spread spectrum spreading code sequence in accordance with said input data signal using said selected transmitter time delay; transmitting said differentially encoded spread spectrum spreading code sequence as a spread spectrum signal; and at said receiver;
    receiving said differentially encoded spread spectrum spreading code sequence;
    selecting a receiver time delay corresponding to a given length of a receiver spread spectrum spreading code sequence said receiver time delay having a length substantially equal to the length of said selected transmitter time delay;
    differentially correlating said received spread spectrum signal with said selected given length of said receiver spread spectrum spreading code sequence using said selected receiver time delay substantially equal to the length of said selected receiver spread spectrum spreading code sequence to recover said input data signal.

2. A method for encoding an input data signal in a code division multiplex spread spectrum system, said method comprising the steps of:
    selecting one of a plurality of spread spectrum spreading code sequences, each of said plurality of spread spectrum spreading code sequences having a distinct unique length;
    selecting a time delay substantially equal to the length of said selected spread spectrum spreading code sequence;
    generating said selected spread spectrum spreading code sequence; and
    differentially encoding said selected spreading code sequence in accordance with said input data signal using a time delay substantially equal to the length of said selected spread spectrum spreading code sequence to form said spread spectrum signal.

3. A method in accordance with claim 2 wherein said step of differentially encoding said selected spread spectrum spreading code sequence in accordance with said input data signal further comprises the steps of:
    inverting the polarity of said generated spread spectrum spreading code sequence, relative to the polarity of said spread spectrum spreading code sequence said selected time delay previously, if said present input data signal is a first logic level; and
    not inverting the polarity of said generated spread spectrum spreading code sequence, relative to the polarity of said generated spread spectrum spreading code sequence said selected time delay previously, if said present input data signal is a second logic level;
    wherein in said selected time delay is substantially equal to the length of said selected spread spectrum spreading code sequence.

4. A method in accordance with claim 3 wherein in said method further comprises generating a present: inversion control signal for controlling the inversion of said chip of said generated spread spectrum spreading code sequence, said method comprising the steps of:
    storing at least some portion of the previous inversion control signal in a delay memory;
    selecting the delay provided by said delay memory to be substantially equal to the length of said selected spread spectrum spreading code sequence; and
    calculating the exclusive OR of said present input data signal and said previous inversion control signal stored in said delay memory to form the present inversion control signal.

5. In a code division multiplex spread spectrum communication system including a spread spectrum signal having a selected spread spectrum spreading code sequence differentially encoded in accordance with an input data signal, a method for correlating said data signal on said spread spectrum signal comprising:
    selecting a time delay substantially equal to the length of said selected spread spectrum spreading code sequence;
    determining whether the presently received chip of said spread spectrum signal and a previously received chip of said spread spectrum signal, said selected time delay previously, are substantially equal;

providing a first output signal indication when said chip of said presently received spread spectrum signal and said chip of said previously received spread spectrum signal are substantially equal; and providing a second output signal indication when said presently received chip of said spread spectrum signal and said previously received chip of said spread spectrum signal are substantially not equal.

6. A method for correlating a spread spectrum signal in accordance with claim 5 wherein said step of determining whether said chip of said presently received spread spectrum signal and said chip of said previously received spread spectrum signal, said selected time delay previously are substantially equal further comprises:

storing at least one chip of the previously received spread spectrum signal in a delay memory;

selecting the delay provided by said delay memory to be substantially equal to the length of said selected spread spectrum spreading code sequence; and calculating the exclusive OR of said chip of said presently received spread spectrum signal, and said stored previous chip of said previously received spread spectrum signal.

7. A code division multiplex spread spectrum communication system for communicating an input data signal between a transmitter and a receiver, said system comprising:

means for selecting a transmitter spread spectrum spreading code sequence of a given length;

means for generating said transmitter spread spectrum spreading code sequence of said given length;

means for selecting a time delay substantially equal to the length of said selected transmitter spread spectrum spreading code sequence;

means for differential encoding said spread spectrum spreading code sequence in accordance with said input data signal using said selected transmitter time delay;

means for transmitting said differential encoded spread spectrum spreading code sequence as a spread spectrum signal;

means for receiving spread spectrum signal including said differentially encoded spread spectrum spreading code sequence;

means, at said receiver, for selecting a receiver time delay corresponding to a given length of a receiver spread spectrum spreading code sequence, said receiver time delay having a length substantially equal to the length of said selected transmitter time delay; and means for differentially correlating said received spread spectrum signal with said selected given length of said receiver spread spectrum spreading code sequence using said receiver time delay, substantially equal to the length of said selected receiver spread spectrum spreading code sequence, to recover said input data signal.

8. A differential spread spectrum data encoder for use in a code division multiplex spread spectrum system having a plurality of selectable length spread spectrum spreading code sequences, said encoder comprising:

an input terminal for receiving a input data signal;
an output terminal;
means for selecting a spreading code sequence of a given length from said plurality of spread spectrum spreading code sequences;

means for selecting a time delay having a length substantially equal to the length of said selected spread spectrum spreading code sequence;

means for generating said selected spread spectrum spreading code sequence;

differential encoding means responsive to said spread spectrum spreading code generating means, and said input data signal at said input terminal, for differentially encoding said selected spread spectrum spreading code sequence in accordance with said input data signal using said time delay substantially equal to the length of said selected spread spectrum spreading code sequence for providing a spread spectrum signal at said output terminal;

said differential encoding means including means for inverting the polarity of said selected spread spectrum spreading code sequence, relative to the polarity of said spread spectrum spreading code sequence said selected time delay previously at said output terminal, if said present input data signal is a first logic level; and said differential encoding means including means for not inverting the polarity of said selected spread spectrum spreading code sequence, relative to the polarity of said selected spread spectrum spreading code sequence said selected time delay previously at said output terminal, if said present input data signal is a second logic level.

9. A differential spread spectrum data encoder in accordance with claim 8, wherein said means for generating said selected spread spectrum spreading code sequence comprises:

a delay memory means having a selectable delay length, said delay memory means having respective input and output terminals; and means coupling the output terminal of said delay memory means to the input terminal of said delay memory means.

10. A differential spread spectrum data encoder in accordance with claim 9, wherein said means for selecting a spread spectrum spreading code sequence of a given length comprises means for loading said delay memory means with said selected spread spectrum spreading code sequence and selecting the selectable delay provided by said delay memory to be substantially equal to the length of said selected spread spectrum spreading code sequence.

11. A differential spread spectrum data encoder for use in a code division multiplex spread spectrum system having a plurality of selectable length spread spectrum spreading code sequences, said encoder comprising:

an input terminal for receiving an input data signal;
an output terminal;
a first exclusive OR gate having first and second input terminals and an output terminal, said first input terminal of said first exclusive OR gate being coupled to said input terminal;

selectable delay memory means having an input and an output terminal, said output terminal of said selectable delay memory means being connected to said second input terminal of said first exclusive OR gate, said input terminal of said selectable delay memory means being connected to said output terminal of said first exclusive OR gate;

a second exclusive OR gate having respective first and second input terminals and a respective output terminal;

means coupling said first input terminal of said second exclusive OR gate to the output terminal of said first exclusive OR gate;

means for selecting a spread spectrum spreading code sequence of a given length from said plurality of spread spectrum spreading code sequences;

said selectable delay memory means and said means for selecting said spread spectrum spreading code sequence of a given length being controlled so as to select the time delay of said delay memory means to be substantially equal to the length of said selected spread spectrum spreading code sequence;

means for generating said selected spread spectrum spreading code sequence;

means coupling said second input terminal of said second exclusive OR gate to the output of said selected spread spectrum spreading code sequence generator means; and means coupling said output terminal of said second exclusive OR gate to said output terminal.

12. A differential spread spectrum data encoder in accordance with claim 11, wherein said selectable delay memory means comprises:

a shift register having an input terminal and a plurality of output terminal taps; and a plural input to single output multiplexer, wherein said plural output taps of said shift register are connected to respective ones of said plural input to said multiplexer.

13. In a code division multiplex spread spectrum communication system including a spread spectrum signal having a selectable length spread spectrum spreading code sequence differentially encoded in accordance with an input data signal, a data correlator comprising:

an input terminal for receiving said spectrum signal;

an output terminal;

a selectable time delay means connected to said input terminal;

differential decoding means, coupled to said input terminal for determining whether the presently received chip of the presently spread spectrum spreading code sequence at said input terminal and a previously received chip of a previously received spread spectrum spreading code sequence said selectable time delay previously, are substantially equal;

said differential decoding means further providing a first logic level output at said output terminal when said present chip of said presently received spread spectrum spreading code sequence and said previous chip of said previously received spread spectrum spreading code sequence said selectable time delay previously, are substantially equal; and said differential decoding means further providing a second logic level output at said output terminal when said present chip of said presently received spread spectrum spreading code sequence and said previous chip of said previously received spread spectrum spreading code sequence said selectable time delay previously are substantially not equal.

14. In a code division multiplex spread spectrum communication system including a spread spectrum signal having a selectable spread spectrum spreading code sequence differentially encoded in accordance with an input data signal, a data correlator comprising:

an input terminal for receiving said spread spectrum signal;

an exclusive OR gate having first and second input terminals and an output terminal, said input terminal for receiving said spread spectrum signal being coupled to said first input terminal of said exclusive OR gate;

selectable delay memory means having input and output terminals, said input terminal, of said selectable delay memory means being coupled to said input terminal for receiving said spread spectrum signal, said output terminal of said selectable delay memory means being coupled to the second input terminal of said exclusive OR gate; and an output terminal coupled to said output terminal of said exclusive OR gate.

15. A data correlator in accordance with claim 14, wherein said selectable delay memory means comprises:

a shift register having an input terminal, and plurality of output terminal taps; and a plural input to single output multiplexer, wherein; said plurality of output taps of said shift register are connected to respective ones of said plurality of input terminals of said multiplexer.

* * * * *